United States Patent
Cohen-Fyffe

[11] Patent Number: 6,129,417
[45] Date of Patent: Oct. 10, 2000

[54] SHOPPING CART CLEAN SEAT COVER

[75] Inventor: Melissa Cohen-Fyffe, 77 Jericho Rd., Pelham, N.H. 03076

[73] Assignee: Melissa Cohen-Fyffe, Pelham, N.H.

[21] Appl. No.: 09/336,944

[22] Filed: Jun. 8, 1999

Related U.S. Application Data

[63] Continuation-in-part of application No. 07/747,119, Aug. 19, 1991, abandoned.

[51] Int. Cl.[7] .................................................. A47C 31/00
[52] U.S. Cl. ................................ 297/219.12; 297/256.17
[58] Field of Search ........................... 297/219.12, 229, 297/256.17, 250.1; 224/411

[56] References Cited

U.S. PATENT DOCUMENTS

| | | |
|---|---|---|
| D. 289,123 | 4/1987 | Tennen . |
| D. 296,730 | 7/1988 | Fetterman . |
| D. 308,614 | 6/1990 | Gordon . |
| D. 342,835 | 1/1994 | Mink . |
| 3,578,380 | 5/1971 | Jacobus . |
| 4,655,502 | 4/1987 | Houllis . |
| 4,666,207 | 5/1987 | Quartano . |

FOREIGN PATENT DOCUMENTS 514644  11/1939  United Kingdom .................... 297/229

Primary Examiner—Milton Nelson, Jr.
Attorney, Agent, or Firm—James A. Sheridan

[57] ABSTRACT

A shopping cart clean seat for use as a seat cover. The shopping cart clean seat made of a thin sheet of flexible material having a front sleeve and a back sleeve to secure the seat cover to the child seating area of the shopping cart. Front and back portions connect the front and back sleeves to a central bottom portion, side portions extend from the central bottom portion, and the portions together cover the child seating area of the shopping cart, respectively. The shopping cart clean seat has piping at the seams of the portions to retain its shape. The front portion of the clean seat has openings for the child's legs to pass through. The back portion of clean seat has grommet openings for a belt to pass through to retain the child.

19 Claims, 6 Drawing Sheets

SHOPPING CART CLEAN SEAT COVER

CROSS-REFERENCE TO RELATED APPLICATIONS

This application is a continuation-in-part of application Ser. No. 07/747,119, filed Aug. 19, 1991, now abandoned, for Little One's Shopping Cart Clean Seat.

TECHNICAL FIELD

This invention relates to covers for seats on shopping carts.

BACKGROUND ART

There are many types of shopping cart seat covers. U.S. Pat. No. 3,578,380 to Jacobus discloses a shopping cart seat cover that completely covers the seat. Jacobus teaches a cover utilizing one sleeve over the rear seat portion in combination with either a drawstring or an elastic material to draw the cover tight over the shopping cart handle. However, Jacobus requires that the step of tying the drawstring or positioning the elastic during the installation of the cart cover.

U.S. Pat. No. 4,651,366 to Lande, et al, discloses a combination infant bed and toddler seat for shopping carts that attaches to the shopping cart seat and appears to surround the toddler. The seat cover is adaptable into a bed and a seat. However, the Lande cover requires the use of hardware to configure and attach the seat to the cart.

U.S. Des. Pat. No. 296,730 to Fetterman discloses a portable baby seat for use in a shopping cart. The Fetterman seat appears to be a complete seat that fits into a cart without an infant seat.

U.S. Des. Pat. No. 289,123 to Tennen discloses a portable seat pad for use in a shopping cart. The Tennen seat pad does not provide for side coverage. Hook-and-loop fasteners appear to secure the front portion of the cover to itself to encase the shopping cart handle.

U.S. Des. Pat. No. 4,655,502 to Houllis discloses a multi-adjustable cushion for a shopping cart. The Houllis cushion does not provide for side coverage. Straps appear to secure the front portion of the cover around the shopping cart handle. The rear portion of the cushion appears to slide over the cart seat back and to fold laterally inward to secure on itself to fit tight to the shopping cart.

U.S. Des. Pat. No. 393,172 to Brady discloses a cushion for use in a child's seat of a shopping. The Brady cushion appears to have one or more adjustable straps to secure the cushion to a shopping cart.

U.S. Des. Pat. No. 380,118 to Ford discloses a child's quilted shopping cart cushion. The Ford cushion does not provide for side coverage. The Ford cushion appears to tie to a shopping cart seat and also appears to have snap closures to secure the cushion to the cart.

U.S. Des. Pat. No. 342,835 to Mink discloses a child seat for use on a shopping cart. The Mink seat appears to cover a shopping cart handle with a hook-and-loop type fastener and does not appear to fully cover the cart in the seating area, especially toward the front of the seat.

U.S. Pat. No. 5,330,250 to Reyes discloses a liner for a shopping cart child seat. The Reyes liner utilizes rigid, bulky elements to line the inside of the shopping cart child seat.

U.S. Des. Pat. No. 308,614 to Gordon discloses a protective cushion attachment for a shopping cart seat. The Gordon cushion covers only the top bar along the front and sides of the cart adjacent the shopping cart seat.

U.S. Pat. No. 4,666,207 to Quartano discloses a child shopping cart cushion. The Quartano cushion does not provide for side coverage and attaches to the shopping cart seat back and handle by straps.

U.S. Pat. No. 4,416,462 to Thompson discloses a removable cushion for a shopping cart. The Thompson cushion is a segmented support pad that does not cover the entire seating area. The pad does not cover the top for the sidebars, the front bars or the handle.

U.S. Pat. No. 5,678,888 to Sowell discloses a shopping cart child seat cover. The Sowell cover uses snap, hook-and-eye or hook-and-loop fasteners to secure the cover to the cart.

U.S. Pat. No. 5,238,293 to Gibson discloses a shopping cart seat cover. The Gibson cover has side panels that adjust to fit a shopping cart. The side panels open to the shopping cart such that the child inside the seat could contact the shopping cart through these panels. The Gibson cover has fastener strips to fasten the cover around the handle.

U.S. Pat. No. 4,805,937 to Boucher discloses a handler cover and seat cover for a shopping cart. The Boucher cover has two separate elements to cover a shopping cart handle and seat. The seat cover is of rigid construction.

U.S. Pat. No. 5,829,835 to Rogers discloses a convertible combination shopping cart seat liner and diaper bag and method of converting same. The Rogers liner uses a flexible fastener to attach the cover to one of the cart walls. The liner also has a decorative skirt that connects to the upper peripheries of the plurality of walls and extends downwardly there from. This skirt does not connect the liner to the cart but rather inhibits the child's contact with the exposed surfaces of the shopping cart seat.

OBJECTS OF THE INVENTION

The invention is advantageous in that it provides a lightweight, unitary cover without unnecessary hardware for convenient carrying, installation and removal. The adult using the cover simply slips the cover over the front region of the seat, usually including the shopping cart handle, and over the back of the shopping cart of the seat to install the cover. The cover's sleeves keep the cover in place and from being pulled off by the child in the seat because the child is in the middle of the cover. The adult user easily removes the cover by pulling the sleeves off of the cart, outwardly from the center of the cover where the child would normally be present.

Another advantage of the invention is in improving the shape retention of shopping cart seat covers by using piping. The piping is installed at the seams of the panel portions, if applicable, and may also be installed in other areas necessary to define the shape of the cover to conform to the shopping cart seat. This is very important in that installation is much easier and can be accomplished more efficiently when the shape of the cover to the seat is well defined.

A further advantage arises from the single material construction of the Shopping Cart Clean Seat. The manufacturing cost is greatly reduced with only one material. Also, regular cleaning of a 100% quilted cotton or polyester/cotton blends can be easily and economically laundered in a regular washer and dryer. Other materials, such as plastic, are easily hand-cleaned. Combinations of materials, such as a cotton central bottom portion with plastic front or back sleeves, or a cotton upper portion lined with a plastic layer to contact the shopping cart, are also possible and advantageous for applications concerned with the child's comfort and not unnecessarily soiling the cover.

DETAILED DISCLOSURE OF THE INVENTION

The current disclosure of a new and useful shopping cart clean seat 10 is illustrated in FIGS. 1–8.

Figure 1:
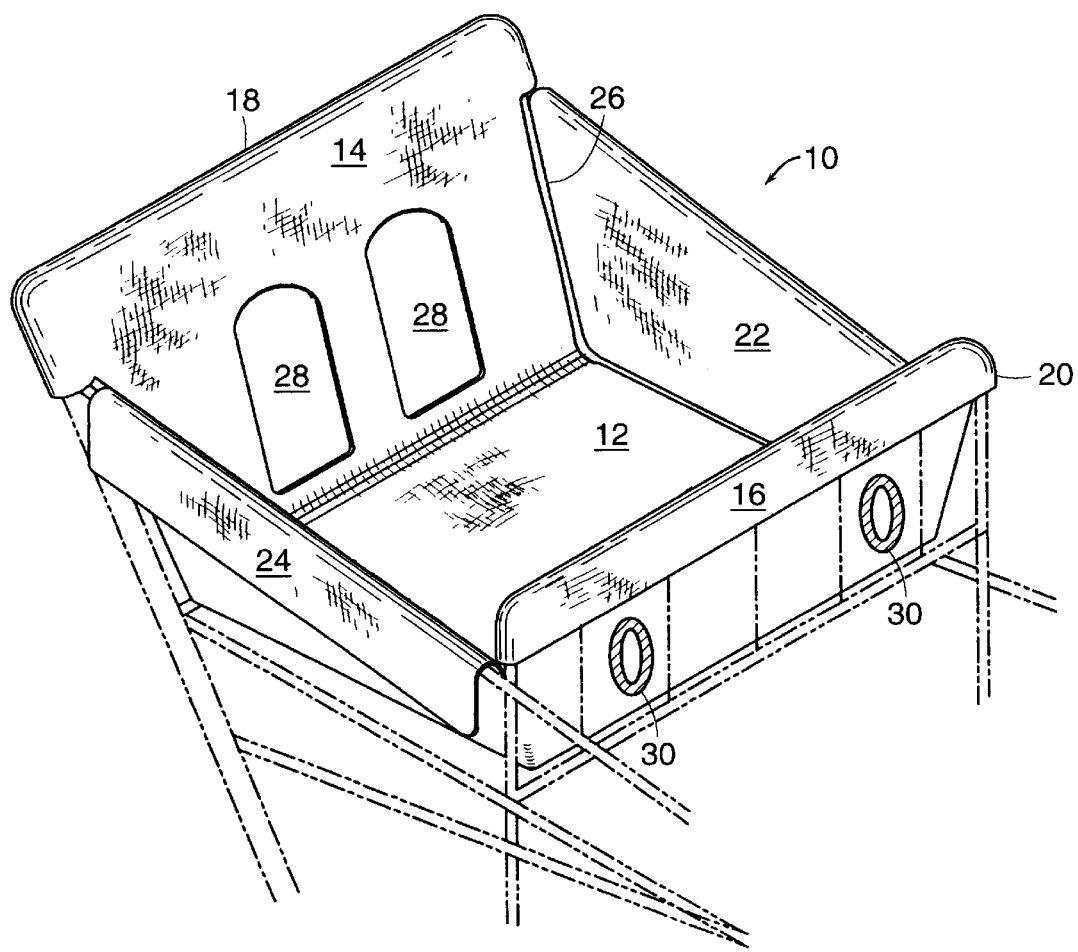
FIG. 1 is a perspective view of the Little One's Shopping Cart Seat, showing the front and back sleeves over the shopping cart handle and the rear seat back, respectively, and the side portions draping over the sides of the shopping cart, respectively, covering the interior of the shopping cart seat.
Figure 2:
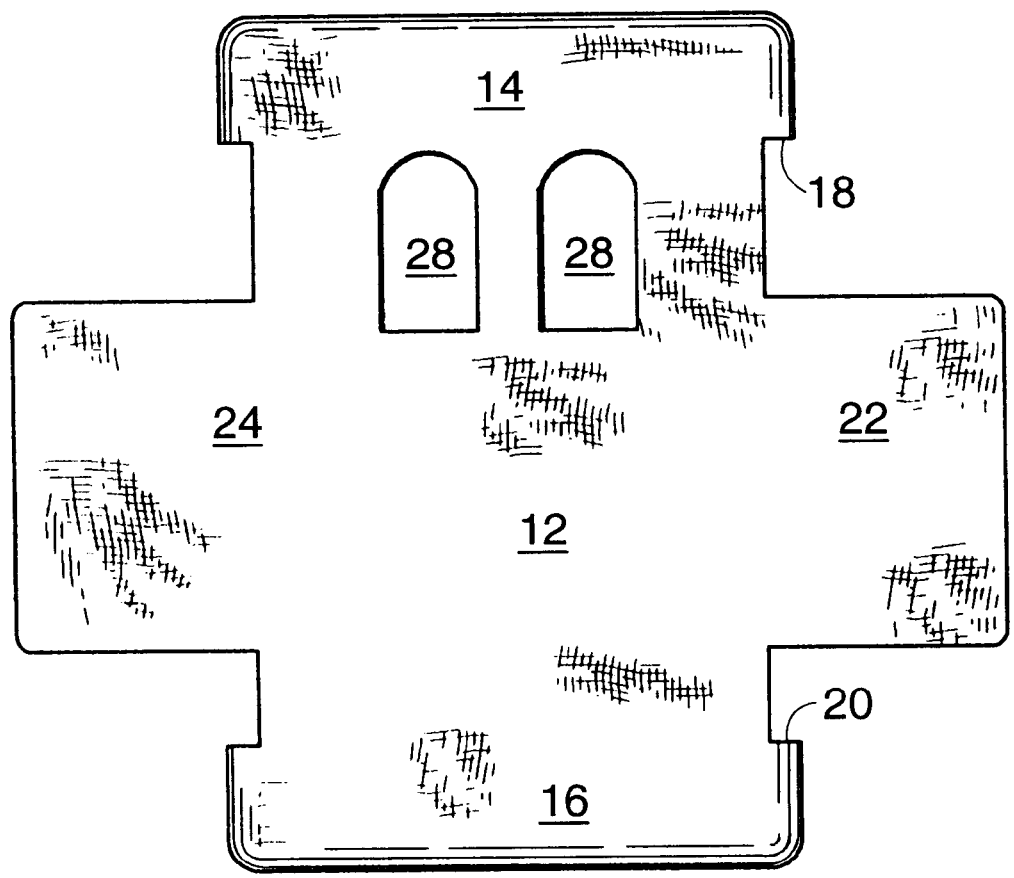
FIG. 2 is a top elevational view of the Little One's Shopping Cart Seat, showing the flexible material with front and back sleeves, without the sides sewn together to form the article as shown in FIGS. 7 and 8.
Figure 3:
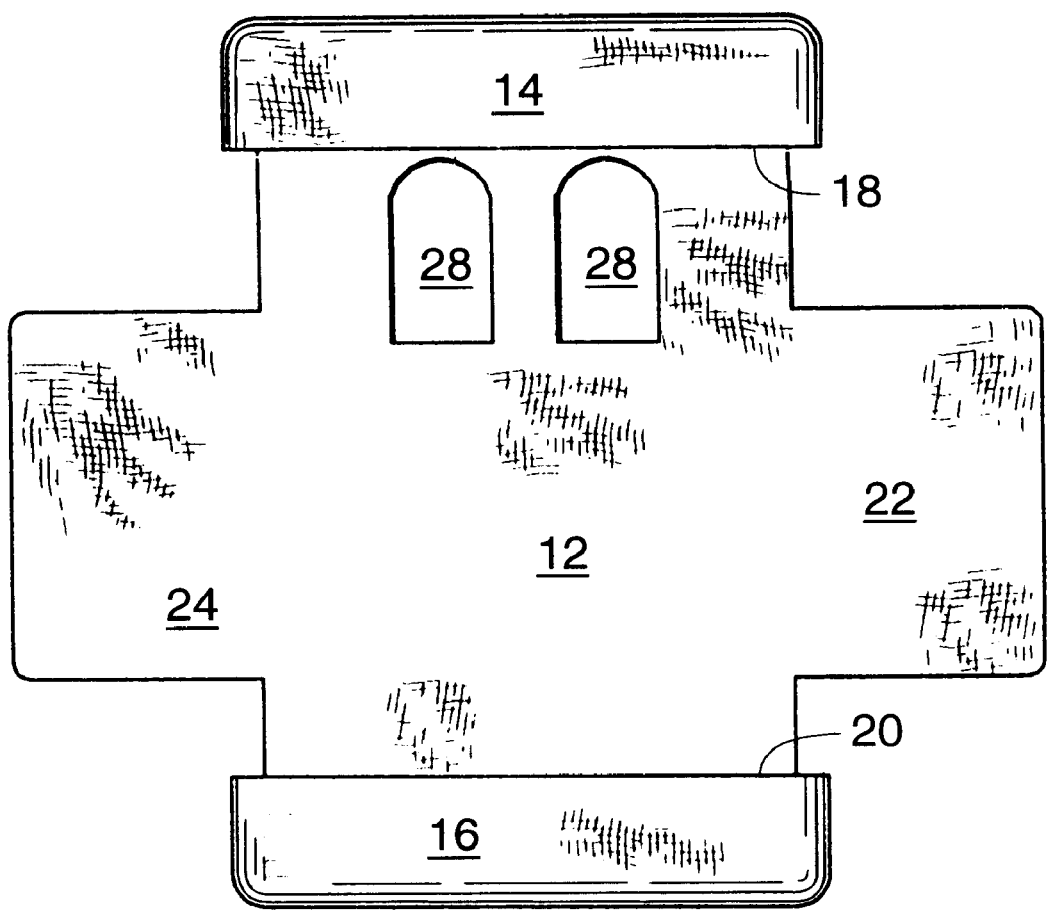
FIG. 3 is a bottom elevational view of the Little One's Shopping Cart Seat, showing the flexible material with front and back sleeves, without the sides sewn together to form the article as shown in FIGS. 7 and 8.
Figure 4:
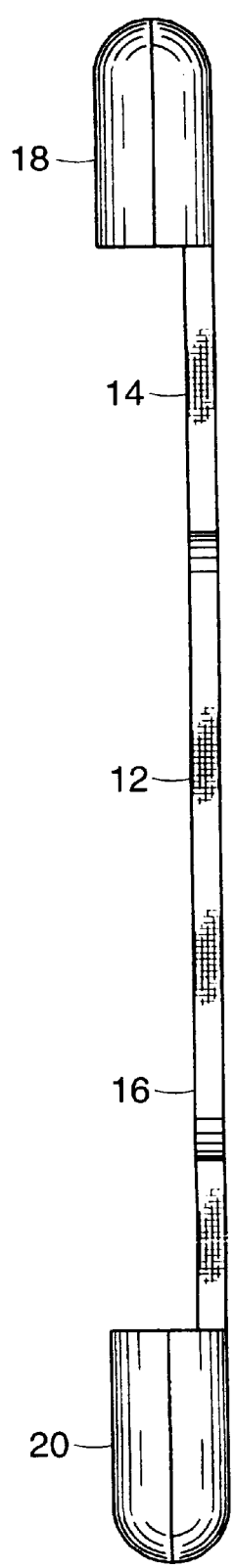
FIG. 4 is a left side elevational view of the Little One's Shopping Cart Seat, showing the flexible material with front and back sleeves, without the sides sewn together to form the article as shown in FIGS. 7 and 8.
Figure 5:
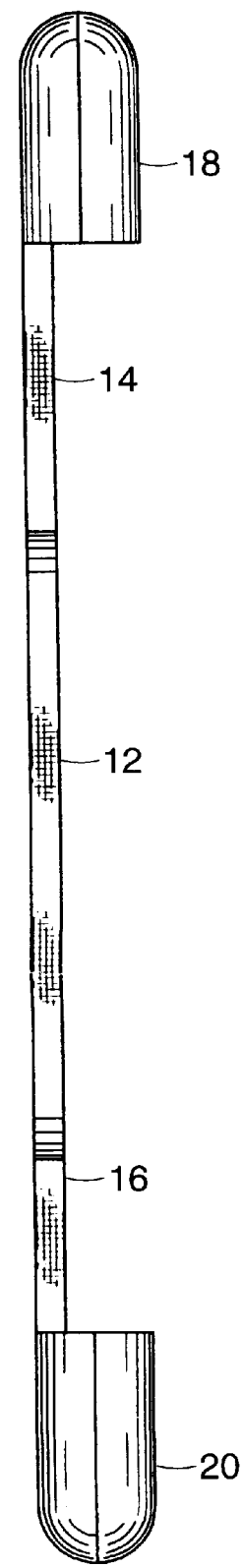
FIG. 5 is a right side elevational view of the Little One's Shopping Cart Seat, showing the flexible material with front and back sleeves, without the sides sewn together to form the article as shown in FIGS. 7 and 8.
Figure 6:
FIG. 6 is a rear elevational view of the Little One's Shopping Cart Seat, showing the flexible material with front and back sleeves, without the sides sewn together to form the article as shown in FIGS. 7 and 8.
Figure 7:
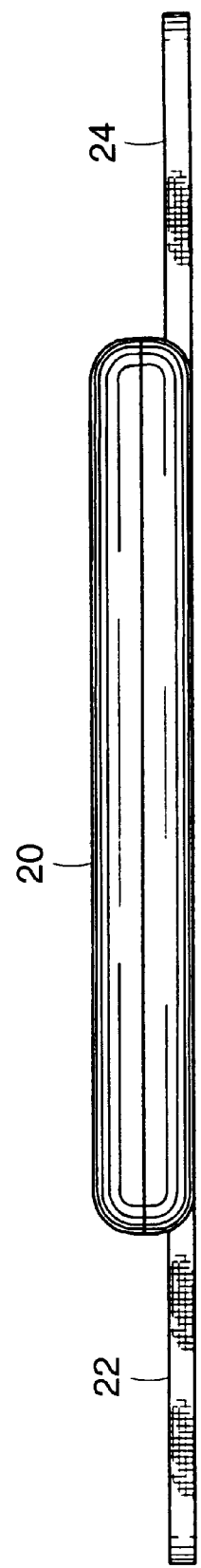
FIG. 7 is a front elevational view of the Little One's Shopping Cart Seat, showing the flexible material with front and back sleeves, without the sides sewn together to form the article as shown in FIGS. 7 and 8.
Figure 8:
FIG. 8 is a perspective view of the Little One's Shopping Cart Seat, showing the front and back sleeves over the shopping cart handle and the rear seat back, respectively, and the side portions draping over the sides of the shopping cart, respectively, covering the interior of the shopping cart seat.

As shown in FIG. 1, the shopping cart clean seat 10 is positioned to cover the entire seating area of a shopping cart. Referring now to FIGS. 2 and 3, the shopping cart clean seat 10 has a central bottom portion 12 with front and back portions 14, 16 extending therefrom. The front and back portions 14, 16 each have a front and back sleeve 18, 20 formed therein. Sleeves 18, 20 each open inwardly toward the central bottom portion 12, respectively. Side portions 22, 24 extend from the central bottom portion 12. Referring again to FIG. 1, the front sleeve 18 is placed over the front of the shopping cart seat area, typically including the shopping cart handle. The back sleeve 20 is placed over the back of the shopping cart seat area, typically including the shopping cart seatback. The side portions 22, 24 cover the side areas of the shopping cart seat. The preceding configuration provides for easy installation in that there are no other devices used to retain the clean seat 10 to the shopping cart. Removal by the shopper is easily accomplished by outwardly removing the sleeves 18, 20 from the cart. Removal by the child is difficult, however, as the child is in the center of the seat.

The central bottom portion 12, front portion 14, back portion 16, and side portions 22, 24, as shown in FIGS. 2 and 3, form the shopping cart clean seat 10. The shopping cart clean seat 10 has individual portions 12, 14 16, 22, 24 joined together along contiguous sides. Other embodiments of the shopping cart clean seat 10 include configurations in which at least two of the portions 12, 14 16, 22, 24 are integral to one another and the remaining portions 12, 14 16, 22, 24 joined together along contiguous sides. Additional embodiments of the shopping cart clean seat 10 include all of the portions 12, 14 16, 22, 24 integral to one another.

The shopping cart clean seat 10 of the preferred embodiment further includes piping 26 along the contiguous edges joining portions 12, 14, 16, 22, 24. The piping 26 causes the shopping cart clean seat 10 to retain a shape similar to the contour of the shopping cart for ease of installation and improved fit. In other embodiments, the piping 26 is configured along the boundaries of all portions 12, 14 16, 22, 24, some of the portions 12, 14 16, 22, 24, or none of the portions 12, 14 16, 22, 24.

The front portion 14 of the shopping cart clean seat 10 of the preferred embodiment contains openings 28 for a child's legs to pass through. The leg openings 28 can be two openings (as shown) or one opening (not shown). In other embodiments, the opening 28 is omitted such that the shopping cart clean seat 10 can accommodate an infant.

The side portions 22, 24 of the shopping cart clean seat 10 of the preferred embodiment are long enough to extend over the edge of the shopping cart. The outer region of the side portions 22, 24 are not joined to the front and back portions 14, 16 to cover the shopping cart sidebars. In other embodiments, the side portions 22, 24 of the shopping cart clean seat 10 are long enough to cover the sidebar of the shopping cart but do not extend over the edge of the shopping cart.

The shopping cart clean seat 10 of the preferred embodiment contains a pair of grommets 30, which allow the passthrough of a safety belt provided by the shopping cart or added to the shopping cart clean seat 10. The grommets 30 are formed in the area adjacent back portion 16 or bottom portion 12. The grommets 30 include reinforced sewing, plastic hardware or a similar means to prevent tearing away from grommets 30. Other embodiments do not include grommets 30.

The portions 12, 14 16, 22, 24 of shopping cart clean seat 10 of the preferred embodiment are a thin sheet of flexible material, which is cotton-quilted material. Other embodiments include thin sheets of flexible material including cotton, polyester, nylon, linen, rayon, wool, felt, other plastics, and combinations of materials including weaves, layers of materials, and portions made from different materials.

What is claimed is:

1. A shopping cart clean seat for use as a seat cover comprising a thin sheet of flexible material formed with a central bottom portion having a longitudinal axis and a lateral axis, said sheet having front and back portions extending from said central bottom portion, said front and back portions forming front and back sleeves, respectively, said sleeves opening inwardly toward said central portion of said sheet, respectively, said front and back portions having first and second edges parallel to said longitudinal axis, respectively, said sheet having first and second side portions extending laterally from said central portion, said first and second side portions having front and back edges parallel to said lateral axis, respectively, said first and second side portions are secured to said front and back portions along said front edge of said first and second side portions to said first and second edges of said front portion, respectively, and along said back edge of said first and second side portions to said first and second edges of said back portion, respectively, whereby the shopping cart clean seat is held into place by said sleeves of said front and back portions placed over a shopping cart handle and a shopping cart seat back, respectively, and said front, back, side and bottom portions cover areas adjacent a shopping cart seat.

2. The shopping cart clean seat in accordance with claim 1 wherein said bottom portion includes first and second grommets whereby a belt can pass through to secure a child.

3. The shopping cart clean seat in accordance with claim 1 wherein said thin sheet of flexible material is cotton quilted material.

4. The shopping cart clean seat in accordance with claim 1 wherein said front, back and central portions are integral.

5. The shopping cart clean seat in accordance with claim 1 wherein said front, back, side, and central portions are integral.

6. The shopping cart clean seat in accordance with claim 1 wherein said thin sheet of flexible material is a polyester and cotton blend material.

7. The shopping cart clean seat in accordance with claim 1 wherein said thin sheet of flexible material is a plastic material.

8. The shopping cart clean seat in accordance with claim 1 wherein piping material secures said front, back, sides and bottom portions together whereby the shopping cart clean seat retains a formed shape.

9. The shopping cart clean seat in accordance with claim 8 wherein said first and second side portions extend beyond said edges secured to said front and back portions whereby said side portion folds over a shopping cart side.

10. The shopping cart clean seat in accordance with claim 8 wherein said back portion includes first and second grommets whereby a belt can pass through to secure a child.

11. The shopping cart clean seat in accordance with claim 1 further defined by said front portion containing leg openings.

12. The shopping cart clean seat in accordance with claim 2 wherein piping material secures said front, back, sides and bottom portions together whereby the shopping cart clean seat retains a formed shape.

13. The shopping cart clean seat in accordance with claim 12 wherein said front, back and central portions are integral.

14. The shopping cart clean seat in accordance with claim 13 wherein said first and second side portions extend beyond said edges secured to said front and back portions whereby said side portion folds over a shopping cart side.

15. The shopping cart clean seat in accordance with claim 14 wherein said back portion includes first and second grommets whereby a belt can pass through to secure a child.

16. The shopping cart clean seat in accordance with claim 12 wherein said front, back, side, and central portions are integral.

17. The shopping cart clean seat in accordance with claim 16 wherein said first and second side portions extend beyond said edges secured to said front and back portions whereby said side portion folds over a shopping cart side.

18. The shopping cart clean seat in accordance with claim 17 wherein said bottom portion includes first and second grommets whereby a belt can pass through to secure a child.

19. A shopping cart clean seat for use as a seat cover comprising a thin sheet of flexible material formed with a central bottom portion having a longitudinal axis and a lateral axis, said sheet having front and back portions extending from said central bottom portion, said front portion containing leg openings, said front and back portions forming front and back sleeves, respectively, said sleeves opening inwardly toward said central portion of said sheet, respectively, said front and back portions having first and second edges parallel to said longitudinal axis, respectively, said sheet having first and second side portions extending laterally from said central portion, said first and second side portions extend beyond said edges secured to said front and back portions whereby said side portion folds over a shopping cart side, said first and second side portions having front and back edges parallel to said lateral axis, respectively, said first and second side portions are secured to said front and back portions along said front edge of said first and second side portions to said first and second edges of said front portion, respectively, and along said back edge of said first and second side portions to said first and second edges of said back portion, respectively, whereby the shopping cart clean seat is held into place by said sleeves of said front and back portions placed over a shopping cart handle and a shopping cart seat back, respectively, and said front, back, side and bottom portions cover areas adjacent a shopping cart seat.

* * * * *

UNITED STATES PATENT AND TRADEMARK OFFICE
Certificate

Patent No. 6,129,417                                             Patented: October 10, 2000

On petition requesting issuance of a certificate for correction of inventorship pursuant to 35 U.S.C. 256, it has been found that the above identified patent, through error and without deceptive intent, improperly sets forth the inventorship.

Accordingly, it is hereby certified that the correct inventorship of this patent is: Melissa Cohen-Fyffe, Pelham, New Hampshire and Lillian Arsenault, Eastham, Massachusetts.

Signed and Sealed this Nineteenth Day of February 2002.

PETER M. CUOMO
*Supervisory Patent Examiner*
Art Unit 3636